United States Patent [19]
Galligan et al.

[11] Patent Number: 5,620,672
[45] Date of Patent: Apr. 15, 1997

[54] LAYERED CATALYST COMPOSITION

[75] Inventors: Michael P. Galligan, Clark; Joseph C. Dettling, Howell, both of N.J.

[73] Assignee: Engelhard Corporation, Iselin, N.J.

[21] Appl. No.: 435,263

[22] Filed: May 5, 1995

Related U.S. Application Data

[62] Division of Ser. No. 202,397, Feb. 25, 1994, Pat. No. 5,422,331.

[51] Int. Cl.⁶ .................................................. C01B 13/00
[52] U.S. Cl. .......................... 423/219; 423/246; 423/247
[58] Field of Search ................................. 423/219, 246, 423/247

[56] References Cited

U.S. PATENT DOCUMENTS

| | | | |
|---|---|---|---|
| 2,742,437 | 4/1956 | Houdry | 502/304 |
| 3,826,736 | 7/1974 | Kittrell | 502/304 |
| 4,143,118 | 3/1979 | Laing | 502/304 |
| 4,171,287 | 10/1979 | Keith | 502/304 |
| 4,173,549 | 11/1979 | Kent et al. | 502/304 |
| 4,184,983 | 1/1980 | Putz et al. | 502/304 |
| 4,206,083 | 6/1980 | Chang | 502/304 |
| 4,261,863 | 4/1981 | Kent et al. | 502/304 |
| 4,343,776 | 8/1982 | Carr et al. | 502/304 |
| 4,405,507 | 9/1983 | Carr et al. | 502/304 |
| 4,492,769 | 1/1985 | Blanchard et al. | 502/304 |
| 4,619,821 | 10/1986 | Ely | 502/301 |
| 4,830,844 | 5/1989 | Kolts | 502/302 |
| 4,849,399 | 7/1989 | Joy, III et al. | 502/302 |
| 4,900,712 | 2/1990 | Bar-Ilan et al. | 502/333 |
| 4,904,633 | 2/1990 | Ohata et al. | 502/333 |
| 4,991,181 | 2/1991 | Upchurch et al. | 502/333 |
| 5,080,882 | 1/1992 | Yoshimoto et al. | 502/333 |
| 5,114,901 | 5/1992 | Tsang et al. | |
| 5,145,657 | 9/1992 | Kobayashi et al. | 502/333 |
| 5,145,822 | 9/1992 | Falke et al. | 502/333 |
| 5,187,137 | 2/1993 | Terui et al. | 502/333 |
| 5,196,390 | 3/1993 | Tauster et al. | 502/333 |
| 5,232,882 | 8/1993 | Yoshimoto et al. | 502/333 |
| 5,250,489 | 10/1993 | Dalla Betta et al. | 502/333 |
| 5,422,331 | 6/1995 | Galligan et al. | 502/333 |

FOREIGN PATENT DOCUMENTS

| | | |
|---|---|---|
| 266875 | 11/1988 | European Pat. Off. . |
| A2215266 | 8/1974 | France . |
| A2270002 | 12/1975 | France . |
| A2462928 | 2/1981 | France . |
| 57776 | 1/1993 | Japan . |
| A9322050 | 11/1993 | WIPO . |

*Primary Examiner*—Helane Myers
*Attorney, Agent, or Firm*—Richard A. Negin

[57] ABSTRACT

A catalyst composition contains a catalytic material having having an undercoat layer containing a mixture of a fine particulate undercoat refractory metal oxide and a sol such as a silica sol, the undercoat providing good adherence to substrates, such as metal substrates, on which the catalytic material is disposed. An overlayer is coated over the underlayer and contains an overlayer refractory metal oxide, which may be the same as or different from the undercoat refractory metal oxide, and on which is dispersed one or more catalytic metal components, such as palladium and manganese components. The metal substrate may be made of, e.g., aluminum or titanium or alloys thereof, and provides a low pressure drop and lightweight catalyst, making the catalyst especially well adapted for use in aircraft to abate ozone in cabin air. A method of making the catalyst composition includes applying the undercoat to the substrate and calcining it, impregnating the overlayer refractory metal oxide with one or more catalytic metal components and depositing the overlayer over the undercoat, and calcining it.

28 Claims, No Drawings

LAYERED CATALYST COMPOSITION

This is a divisional of application Ser. No. 08/202,397 filed on Feb. 25, 1994, now U.S. Pat. No. 5,422,331.

BACKGROUND OF THE INVENTION

1. Field of the Invention

The present invention relates to an improved catalyst composition comprising a layered catalytic material dispersed on a substrate, the catalytic material containing one or more catalytic metal components, and to a method of making the catalyst composition. More particularly, the present invention relates to a catalyst composition as aforesaid comprising an undercoat on which is dispersed an overlayer comprising at least one catalytic metal component, for example, a palladium catalytic component. The catalyst composition of the present invention is particularly well suited for the abatement of ozone and other noxious substances in an airstream.

2. Description of Related Art

U.S. Pat. No. 4,206,083 of J. C. Chang discloses the co-precipitation of platinum, palladium and manganese oxide on a ceramic support, such as a cordierite support, in order to provide a catalyst suitable for the reduction of ozone content of air intended for human respiration. The Chang Patent refers to U.S. Pat. No. 3,269,801 as evidence that it had been long recognized that ozone is present in the atmosphere in toxic concentrations at altitudes of about 9 to 46 kilometers. Aircraft flying at those altitudes scoop in cabin air from the outside atmosphere which, because it is very much compressed, is raised in temperature to several hundred degrees Centigrade. Such air is treated to reduce the ozone concentration of it to below 1 part per million ("ppm") to render it fit for use as cabin air.

U.S. Pat. No. 5,187,137 to S. Terui et al discloses an ozone abatement catalyst comprising a composition containing manganese oxide and metallic palladium and/or palladium oxide as the essential ingredients, formed as a thin film on a support. The method of preparing the catalyst includes coating on a support a slurry containing manganese oxide, metallic palladium and/or a palladium compound, and an inorganic oxide sol as a binder, for example, an alumina sol, silica sol, titania sol or zirconia sol. See column 2, line 53 through column 3, line 5 and column 4, lines 16–19. At column 3, line 62 to column 4, line 3, the Terui et al Patent discloses that the support, i.e., the substrate on which the catalytic material is disposed, may be a cordierite or other similar inorganic support, or it may be a metal support.

U.S. Pat. No. 4,900,712 of A. Bar-Ilan et al discloses a catalytic washcoat in which one or more catalytically active non-noble metal oxides ("dopants") such as iron oxide are deposited from neutral aqueous colloidal solutions thereof onto preformed high surface area crystalline alumina. The neutral colloidal compounds are said to provide a uniform, thin coating of the non-noble dopants on the alumina particles and to avoid the use of noxious elements such as nitrates or chlorides, thereby substantially eliminating any air pollution hazard. See the paragraph bridging columns 3 and 4 of the Patent, and column 5, lines 23–26. The reference to eliminating air pollution hazards appears to be with reference to the manufacture of the catalyst, see column 1, lines 29–41.

U.S. Pat. No. 4,343,776 issued to W. F. Carr discloses an ozone abatement catalyst containing at least one platinum group metal (platinum, palladium or rhodium) or catalytically active compound thereof and an oxide or aluminate of at least one non-precious Group VIII metal (iron, cobalt or nickel). By applying the non-precious metal oxide as an alumina slip prior to application of the platinum group metal component to the substrate, the platinum group metal, e.g., palladium, is preferentially exposed to the ozone. See column 2, line 53 to column 4, line 19. The carrier or support, i.e., the substrate, may be any one of a wide range of materials, including aluminum, as described at column 2, line 56 to column 3, line 3.

U.S. Pat. No. 5,250,489 to R. A. Dalla Betta et al discloses a catalyst structure configured to provide heat exchange in which the support, i.e., substrate, is a metallic support which may comprise aluminum or aluminum alloys, provided the latter are used at temperatures which will not deform or melt the material. See column 6, lines 16–22. However, other materials, including aluminum-containing steels, are preferred (column 5, line 46 et seq).

U.S. Pat. No. 5,080,882 of M. Yoshimoto et al discloses an ozone decomposition catalyst disposed on a thin porous carrier (substrate) material which has micropores of preferably not less than 30 microns in diameter for ozone abatement, in order to prevent substantial pressure loss. See column 2, lines 5–15. Any suitable known ozone catalyst may be utilized, including oxides of manganese, iron, silver, nickel or copper and a noble metal such as platinum or palladium or a mixture of two or more of these. See column 2, line 16 et seq.

SUMMARY OF THE INVENTION

In accordance with the present invention there is provided a catalyst composition comprising a catalytic material coated on a substrate, in which the catalytic material comprises an undercoat layer and an overlayer. The undercoat layer comprises a mixture of a fine particulate refractory metal oxide and a sol selected from silica, alumina, zirconia and titania sols, and the overlayer comprises a refractory metal oxide support on which is dispersed at least one catalytic metal component.

In accordance with another aspect of the present invention there is provided an ozone abatement catalyst composition comprising a catalytic material coated on a substrate, in which the catalytic material comprises an undercoat layer and an overlayer. The undercoat layer comprises a mixture of a fine particulate undercoat refractory metal oxide and a silica sol, and the overlayer comprises an overlayer refractory metal oxide support on which is dispersed a catalytic metal component comprising a catalytically effective palladium component, for example, a palladium component and a manganese component.

One aspect of the present invention provides that the undercoat comprises from about 5 to 50 percent by weight of the refractory metal oxide and from about 50 to 95 percent by weight of the silica sol. Another aspect of the invention provides for the catalyst composition to be a non-chloride composition. Another aspect provides that the catalytic material further comprises a chloride ion scavenger, for example, a silver compound. Yet another aspect of the present invention provides that the substrate comprises a body having a plurality of gas flow passages extending therethrough, the passages being defined by walls on which the catalytic material is coated, and the loading of the underlayer does not exceed about 0.3 g/in$^3$.

Other aspects of the present invention include the following aspects, alone or in combination: the catalytic metal component may comprise a palladium component and a manganese component; the fine particulate refractory metal oxide of the undercoat and the refractory metal oxide of the overlayer may, but need not, be the same refractory metal oxide, for example, a silica-alumina.

Yet another aspect of the present invention provides that the substrate may comprise a metal substrate made of a metal selected from the class consisting of aluminum, aluminum alloys, titanium and titanium alloys.

A method aspect of the present invention provides a method of preparing a catalyst composition comprising the following steps. An undercoat layer comprising a mixture of a fine particulate undercoat refractory metal oxide and a silica sol is applied to a substrate by contacting the substrate with an undercoat slurry of the undercoat refractory metal oxide and silica sol in a liquid medium, for example, an aqueous liquid medium, and thereafter heating the applied undercoat to fix it to the substrate. An overlayer comprising an overlayer refractory metal oxide is applied to the undercoat obtained in the foregoing step by contacting the substrate containing the undercoat with an overlayer slurry of overlayer refractory metal oxide particles in a liquid medium, for example, an aqueous liquid medium, and thereafter heating the applied overlayer slurry to fix it to the undercoat. At least one catalytic metal component is applied to the overlayer refractory metal oxide.

Another aspect of the method of the present invention includes applying the catalytic metal component by impregnating the overlayer refractory metal oxide with a solution of one or more salts comprising a precursor of one or more catalytic metal components, for example, a palladium amine salt such as one selected from the group consisting of palladium tetraamine hydroxide and palladium tetraamine acetate or palladium nitrate.

As used herein and in the claims, reference to a catalytic metal component includes any suitable catalytically active form of the component, for example, and without limitation, as the elemental metal, as an alloy and as a metal oxide or other compound.

Other aspects of the invention are disclosed in the following description.

DETAILED DESCRIPTION OF THE INVENTION AND PREFERRED EMBODIMENTS THEREOF

It is well-known that many suitable substrates (sometimes referred to in the art as "supports" or "carriers") may be utilized to support catalyst compositions thereon. For example, it is known to utilize substrate bodies, often referred to as "honeycombs", comprising a monolithic body having a plurality of fine, parallel gas flow channels extending therethrough. Such substrates may be extruded from ceramic-like compositions such as cordierite or other similar highly refractory materials. Although such cordierite or other ceramic-like substrates are useful in many applications, they are heavier than some metal substrates and, because the walls thereof are usually thicker than the walls of metal substrates, cause a higher pressure drop in gases forced through them than do similar catalysts in which the substrate is formed of a metal. Further, cordierite and other such substrate bodies are more susceptible to mechanical and thermal shock damage than are metal substrates.

A suitable catalytic material is applied to the substrate by coating the gas flow passages of the substrate with the catalytic material. Conventionally, such catalytic material comprises a fine particulate refractory metal oxide, such as a high surface area alumina, on which is dispersed one or more catalytic metal components.

One problem with the utilization of metal substrates is the difficulty of adhering the coating of catalytic material to the metal substrate with sufficient strength to prevent or minimize spalling of the coating of catalytic material from the substrate. The present invention overcomes this problem by applying an undercoat layer which comprises a mixture of a fine particulate refractory metal oxide and a sol, such as a silica sol, an alumina sol, a zirconia sol or a titania sol. Such sols tend to shrink and crack upon drying. Further, the catalyst, even if it is not subjected to high temperatures in use, usually must be heated to a high temperature, e.g., 400° to 550° C. to adhere or fix the coating of catalytic material to the substrate. Heating under such conditions tends to aggravate the shrinkage and cracking of a coating of silica or other sol on the substrate, leaving discontinuities in the coating which will render the coating subject to spalling or flaking off the substrate. The combination of, preferably, a minor amount of a fine particulate refractory metal oxide with the sol has been found to eliminate or at least reduce the tendency of the sol undercoat to crack upon drying and/or heating. Up to about a 1 to 1 weight ratio of the refractory metal oxide to the sol may be used. Thus, the proportion of sol to fine refractory metal oxide in the undercoat may be from about 1 to 20 parts by weight sol (dry solids basis) to one part by weight of undercoat refractory metal oxide.

Without wishing to be bound by any particular theory, it is believed that the interspersion of the refractory metal oxide in the sol tends to prevent or reduce shrinkage and cracking of the undercoat upon drying and heating of the sol layer on the metal substrate. On the other hand, the addition of minor amounts of sols or binders to the overlayer containing the catalytic metal component, i.e., the catalytically active component, does not improve adhesion of the washcoat to the substrate and may adversely affect the catalytic activity of the composition.

Another difficulty encountered with metal substrates is their tendency to corrode, especially if the catalytic material contains significant quantities of chlorides. Therefore, one aspect of the present invention provides that the catalytic material either be substantially chloride free or at least comprise a non-chloride composition in which any chlorides present are only those which result from trace impurities in the materials forming the catalytic composition. Thus, reference herein and in the claims to a catalyst composition which is "a non-chloride composition" means catalyst compositions made of non-chloride materials and containing no more than trace quantities of chlorides present as impurities. Such trace impurities usually cannot be economically removed. A scavenger may be utilized in the catalytic material of the present invention, for example in the undercoat layer, to scavenge any trace or residual chloride ions which may be present. Silver compounds such as silver oxide provide a suitable chloride scavenger material by reacting with the chlorides to form a water-insoluble species, silver chloride.

Ozone abatement catalysts, especially those containing a palladium catalytic component, are effective at temperatures as low as about 100° F. (37.7° C.), although the rate of ozone abatement is increased if the air or other gas stream being treated is heated to a higher temperature. Nonetheless, in some applications it is highly desirable to have the catalyst composition be effective over a broad range of inlet gas temperatures, on the order of about 100° to 300° F. (21.1° to 148.9° C.). For effective low temperature operation it is desirable that a high density of the noble catalytic metal, such as palladium, be attained in highly dispersed form on the refractory metal oxide support. It has been found that the desired high density of palladium catalytic component is enhanced if the soluble palladium salt used to impregnate the overlayer refractory metal oxide particles is a solution of a palladium amine salt, such as palladium tetraamine hydroxide or palladium tetraamine acetate, or palladium nitrate. The use of such salts, especially in combination with a high porosity refractory metal oxide support as described below is found to give higher densities of palladium with improved dispersion on the overlayer refractory metal oxide than that attainable under similar conditions with other palladium salts, such as palladium acetate or palladium chloride. Of course, as noted above, palladium chloride is preferably not used in any case in order to render the catalyst composition a non-chloride composition and thereby ameliorate or prevent corrosion of metal substrates on which the catalyst composition is carried.

The Substrate

As indicated above, metal substrates have certain advantages over cordierite or other ceramic-like substrates, including reduced pressure drop and, for certain metals, lower weight per unit of volume. Metal substrates are conventionally made by spiral-winding a flat and corrugated metal strip into a coil with the corrugations running parallel to the longitudinal axis of the coil to provide a plurality of fine, parallel gas flow passages extending through the metal substrate. The coil is stabilized to prevent "telescoping" of the spiral-wound metal strips by the utilization of pins or other mechanical fasteners driven through the coil or by brazing or spot or resistance welding the wound metal strip layers to each other. Such brazing or welding may take place either at one or both end faces, throughout the body, or at selected portions of the body, as is well-known in the art.

For ozone abatement catalysts intended for use on aircraft in order to abate ozone in air destined for use as cabin atmosphere, it is particularly important that the catalyst be of as low weight as possible. It has been found that a highly satisfactory catalyst of light weight can be made in accordance with the teachings of the present invention by utilizing a metal substrate in which the metal is aluminum or an aluminum alloy such as an aluminum-magnesium alloy. Alternatively, the metal substrate may be made of titanium or a titanium alloy. However, aluminum is lighter than titanium, less expensive and easier to weld or braze in order to form a satisfactory metal substrate. Accordingly, metal substrates made of aluminum or aluminum alloys are, to that degree, preferred. In particular, an aluminum-magnesium alloy provides greater hardness, strength and corrosion resistance than aluminum, but cannot readily be brazed due to the magnesium content. Accordingly, aluminum-magnesium alloy metal substrates would have to rely on pins or other mechanical fasteners to provide a rigid metal substrate structure.

Generally, any suitable substrate material may be employed, including cordierite or other ceramic-like materials, as well as suitable metals other than aluminum, titanium and their alloys, such as Inconel metals, e.g., Inconel 625, and suitable stainless steels such as 304, 316 and 404 stainless steels. Generally, the metal substrates have substantially thinner walls than cordierite or other ceramic-like substrates and yet provide adequate mechanical strength and better resistance to thermal shock than do cordierite or similar substrates, and to that extent are preferred. The thinner walls of metal substrates as compared to cordierite substrates assist in reducing the pressure drop sustained by a gas forced through the substrate.

The metal strip or foil used to manufacture the metal substrate of the catalyst preferably has a thickness of from about 1 to 3 mils and, in one embodiment, may be configured to have about 400 cells (gas flow channels) per square inch (62 cells per square centimeter) of end face area. Metal substrates useful in the present invention may be configured to have anywhere from 100 to 600 cells per square inch (15.5 to 93.0 cells per square centimeter) of end face area, preferably from 300 to 500 cells per square inch (46.5 to 77.5 cells per square centimeter).

The Undercoat

One difficulty which results from the utilization of metal substrates is that of obtaining adequate adherence of the coating of catalytic material to the substrate. This problem may be overcome in accordance with the teachings of the present invention by the provision of a highly adherent bonding undercoat over which an overlayer containing one or more catalytic metal components is applied. A suitable undercoat is made from a low chloride sol which contains less than 50 ppm by weight of chlorides. Other suitable sols such as low chloride alumina, titania and zirconia sols may also be employed in the compositions of the present invention.

An undercoat washcoat may be prepared by combining the sol with a fine particulate refractory metal oxide. In order to distinguish the refractory metal oxide used in the undercoat from that which may be used in the overlayer described below, the refractory metal oxide used in the undercoat is in the claims and sometimes herein referred to as the "undercoat refractory metal oxide". The undercoat refractory metal oxide may comprise, for example, particles of a particle size such that 90% by volume of the particles are 2 microns or less in diameter. The refractory metal oxide particles, for example, activated alumina particles coated with silica, are mixed with the silica sol in an aqueous medium and, optionally, a chloride scavenger such as particulate silver oxide may be added thereto. The slurry may contain from about 5 to 50 percent by weight refractory metal oxide particles and from about 50 to 95 percent by weight (dry solids basis) of the sol and the total solids content (dry basis) of the slurry utilized may be from about 10 to 30 percent by weight of the total weight of the slurry. It will be appreciated that any suitable refractory metal oxide particles may be employed, such as activated alumina particles (comprising predominantly gamma-alumina although other phases such as delta and theta are usually present), silica particles, zirconia particles or titania particles, or mixtures or composites of one or more of the foregoing.

The metal substrate, for example, an aluminum or aluminum alloy substrate, is dipped into the slurry so that the fine gas flow passages of the honeycomb are completely coated by the slurry. Alternatively, slurry may be drawn through the fine gas flow panels by suction. Excess slurry may be blown out of the gas flow channels with compressed air. The coated substrate may be dried in air and then calcined in air at a temperature of about 300° C. to 600° C. for a period of from about one-quarter to two hours, in order to fix the undercoat to the substrate.

Optionally, the metal strips from which the metal substrate is prepared may be chemically treated or otherwise have their surfaces roughened to promote better adherence between the undercoat and the metal.

The Overlayer

The catalytic metal component or components are dispersed on the overlayer, which may comprise refractory metal oxide particles which serve as a support on which the one or more catalytic metal components are dispersed. The overlayer is deposited on the undercoat, either directly or with an intermediate layer between the undercoat and the overlayer. The refractory metal oxide used in the overlayer may be the same as or different from the refractory metal oxide used in the undercoat. In order to distinguish it from the refractory metal oxide used in the undercoat, the refractory metal oxide used in the overlayer is in the claims and sometimes herein referred to as the "overlayer refractory metal oxide". Any suitable refractory metal oxide, such as any of those identified above as suitable for the undercoat refractory metal oxide, may be used as the overlayer refractory metal oxide to provide a support for the catalytic metal component or components. Generally, particles of high surface area, e.g., from about 100 to 500 square meters per gram ("$m^2/g$") surface area, preferably from about 150 to 450 $m^2g$, more preferably from about 200 to 400 $m^2/g$, are desired so as to better disperse the catalytic metal component or components thereon. The overlayer refractory metal oxide also desirably has a high porosity of pores up to 1456 Angstroms radius, e.g., from about 0.75 to 1.5 cubic centimeters per gram ("cc/g"), preferably from about 0.9 to 1.2 cc/g, and a pore size range of at least about 50% of the porosity being provided by pores of 50 to 1000 Angstroms in radius. For example, the overlayer refractory metal oxide may be a silica alumina comprising from about 1 to 10 percent by weight silica and from about 90 to 99 percent by weight alumina.

The overlayer refractory metal oxide may be impregnated with one or more suitable catalytic metal salts, such as a palladium salt, preferably a palladium amine salt such as palladium tetraamine acetate, palladium tetraamine hydroxide or palladium nitrate, then dried and calcined in air. The resulting impregnated refractory metal oxide powder may then be slurried with distilled water and other catalytic metal components may be added to the slurry. For example, a soluble non-chloride manganese salt, e.g., manganese nitrate, may be added to further impregnate the overlayer refractory metal oxide powder with a precursor of manganese or manganese oxide. The contents of the overlayer slurry are thoroughly blended and the undercoated substrate is then coated with the overlayer slurry of metal- and/or metal compound-impregnated overlayer refractory metal oxide in a manner similar to that in which the undercoat was applied. The coated substrate is then dried and calcined to provide a catalyst in accordance with the present invention. The palladium and manganese catalytic metal components have been found to be particularly effective for the abatement of ozone in airstreams, even at relatively low operating temperatures. Alternatively, a slurry of the overlayer refractory metal oxide may be coated over the undercoat, dried and calcined and the thus overlayered substrate immersed in one or more solutions of suitable catalytic metal salts, dried and calcined.

Obviously, different catalytic metal components may be utilized depending on the intended use of the catalyst. In some embodiments, catalytic metal components which are useful for the abatement of ozone may be supplemented with other catalytic metal components. The palladium and manganese oxide components which are preferred for an ozone abatement catalyst may also be useful for other pollutants. For example, a manganese catalytic component is known to react with hydrogen sulfide and may release the sulfur as sulfur dioxide if elevated temperatures are attained. In addition, the oxidation of carbon monoxide and hydrocarbons can take place with a palladium and manganese catalytic component-containing catalyst as the catalyst heats up somewhat during operation. Obviously, heating means may be supplied to heat the catalyst itself or the gas stream being introduced to the catalyst. Carbon monoxide and hydrocarbons are generated by tobacco smoke so the preferred ozone abatement catalyst of the invention may be employed to treat not only makeup air introduced from outside the aircraft (or other vehicle) but to treat recycled cabin air which might contain the products of tobacco combustion. Generally, the catalysts of the invention will find a variety of uses. For example, those embodiments of the invention useful for ozone abatement may be used to treat not only the cabin atmosphere of aircraft, trains, buses and other vehicles, but to abate ozone in equipment, such as xerographic copy machines, which generate ozone. The catalyst of the present invention may also be employed for air handling systems for residences, office and factory buildings, public buildings, hospitals and the like. Such systems can conveniently include means to heat the air being introduced into the catalyst and/or to heat the catalyst itself in order to enhance conversion efficiency. In air handling systems, the substrate on which the catalyst is coated need not be a honeycomb-type carrier or other substrate specifically configured to support a catalyst, but the catalytic material could be applied to any portion of the air handling system in which the air sustains turbulent flow. Thus, a catalytic material may be applied to the blades of an air handling fan or compressor, to a grill, louvers or other air-directing structure disposed immediately downstream (as sensed in the direction of air movement) from the blades of the fan or compressor, or on other structures over which the air of the air handling system is forced in turbulent flow. For applying the catalyst to such structures, for example, fan blades, the fan blades would be sandblasted or otherwise treated to remove any paint or finish and to roughen the surface to accept the catalyst composition to be applied thereto. After such treatment, the fan blades or other structure (louvers, grills, etc.) may be coated, for example, with an undercoat and overlayer to provide a catalytic material coating as described elsewhere herein.

For an ozone abatement catalyst, the catalyst loading is preferably from about 150 to 250 grams of palladium per cubic foot of catalyst volume. (The catalyst volume is the volume of the finished catalyst and therefore includes the void spaces provided by the fine gas flow passages of the metal substrate. All references herein and in the claims to a grams per cubic foot ("$g/ft^3$") or grams per cubic inch ("$g/in^3$") loading or quantity refer to the weight per unit volume of the catalyst composition, i.e., the catalytic material coated onto the substrate.) The high (150 to 250 $g/ft^3$) loading of palladium catalytic component provides a catalyst which can decompose 90 to 95 percent of the ozone content of a treated gas (air) stream by employing, for example, a five-segment or seven-segment catalyst and an inlet temperature of the gas (e.g., air) of 70° to 100° F. (21.1° to 37.7° C.). The individual segments are from 0.5 to 1.5 inches in length (the length of the gas flow passages) and are desirably spaced apart about 0.063 to 0.25 inches (0.160 to 0.635 centimeters) from each other in order to provide turbulence-inducing empty spaces between adjacent segments to break up laminar flow of the gas being treated. The use of multiple, spaced-apart segments of catalyst is a known expedient in the art. The empty spaces between adjacent catalyst segments also promote mixing of the gas stream being treated thereby increasing the effectiveness of the catalytic action, especially at the relatively low temperatures at which ozone abatement is often carried out.

The following example illustrates the preparation of an ozone abatement catalyst in accordance with the present invention.

EXAMPLE 1

Preparation of the Undercoat

1. A jet-milled silica-alumina support containing 5.5 weight percent silica dispersed on gamma-alumina particles, based on the combined weight of the silica and gamma-alumina is slurried in distilled water. This material was measured as having a surface area of 271 m$^2$/g, an average pore radius of 74 Angstroms, and a total porosity of 1.00 cc/g. This material was ball milled to a particle size distribution of more than 90 percent by volume of the particles having a particle size of 2 microns diameter or less. The material is milled to a solids content in excess of 30% with approximately 0.5% by weight of acetic acid added on a solids basis.

2. A "chloride-free" silica sol containing less than 10 parts per million by weight ("ppm") chloride has a particle size of about 200 Angstroms and a 27 to 28% true solids basis.

3. The materials of steps 1 and 2 are blended together in a ratio of three parts by weight of the silica sol (dry solids basis) to one part by weight of the silica-alumina support in distilled water to approximately an 18% solids concentration measured at 150° to 200° F. Distilled water is added as needed to provide the desired solids content. The viscosity of the resultant undercoat slurry is approximately 80 to 100 cps and the pH is between 8 to 9.

4. A series of metal substrates were made of aluminum and aluminum-magnesium alloys 3003, 5056 and 3104 (alloy numbering system of the American Aluminum Association). Flat and corrugated metal strips of these metals having a thickness of about 1 to 2 mils were spiral-wound to fabricate cylindrical metal substrates in which the flat and the corrugated strip alternated to provide about 400 cells per square inch (62.0 cells per square cm) of end face area. The metal substrates were about 0.85 inches (2.15 cm) long and 8.2 inches (20.83 cm) in diameter. The substrates were dipped into the above undercoat slurry and the cells (gas flow passages) were cleared with an air knife to the desired wet weight target.

5. The substrates were then dried with forced air at about 100° C. and then calcined at 450° C. for 1 hour in air. Following calcination, an air gun was used to remove residual particles on the surface of the substrate. These undercoated substrates have a target loading of about 0.25 g/in$^3$ of an undercoat layer, with a 0.2 to 0.3 g/in$^3$ expected range, the undercoat layer comprising a 3:1 weight ratio of silica sol (dry solids basis) to silica-alumina refractory metal oxide.

Preparation of the Overlayer

This preparation uses the following materials: palladium tetraamine acetate solution, a silica-alumina refractory metal oxide, and manganous nitrate solution. All solutions are prepared with distilled water.

6. A jet-milled silica-alumina powder, the same silica-alumina used to prepare the undercoat, serves as the overlayer refractory metal oxide to provide a support for the metal catalytic components. By the incipient wetness technique, the support is impregnated with a solution of palladium acetate, Pd(NH$_3$)$_4$(CH$_3$COOH)$_2$, in distilled water. By "incipient wetness technique" is meant that the amount of palladium tetraamine acetate solution applied to the silica-alumina powder is limited to avoid the formation of a distinct liquid phase, so that although the powder is thoroughly wetted by the solution, a slurry is not formed. The palladium tetraamine acetate solution contains about 12.3 weight percent palladium salt. The palladium salt solution is applied to the silica-alumina powder using a dispensing buret/drop column and is not diluted during the impregnation. After impregnation of the silica-alumina powder with the palladium salt solution, the powder is dried and calcined in a clean furnace at 450° C. for one hour in air. The Pd metal loading on the silica-alumina support for this catalyst is targeted at 250 g Pd/ft$^3$, the silica-alumina loading is targeted at 1.2 g/in$^3$ and the MnO loading is targeted at 0.07 g/in$^3$. The target overlayer loading is thus about 1.41 g/in$^3$, including the Pd. The Pd metal concentration on the silica-alumina support, i.e., on the overlayer refractory metal oxide, was 12.06 weight percent palladium metal.

7. The impregnated silica-alumina powder obtained in step 6 was then slurried in distilled water using a shear mixer and ball mill with a manganous nitrate solution and containing about 21.65% MnO equivalent in distilled water. The resulting overlayer slurry is then blended to approximately 32 to 34% solids concentration at 150° to 200° F. Viscosity can range from 200 to 279 cps and the pH range is 4.8 to 5.3 at room temperature.

8. The substrates coated with the underlayer as described above are coated with the overlayer slurry to the desired wet weight target by being dipped into the overlayer slurry after which the cells (gas flow passages) are cleared with an air knife. The coated substrate is then dried and calcined at 450° C. for one hour in air. The heating decomposes the palladium salt to Pd or PdO and the manganese salt to an oxide of manganese.

The finished catalysts obtained in accordance with Example 1 may be mounted in a conventional manner within a suitable canister, which may be made of a suitable metal such as stainless steel or titanium or a titanium alloy. As is conventional in the art, the canister will normally have truncated cone-shaped inlet and outlet sections with the bases of the cones adjacent the opposite end faces of the cylindrical substrate, to facilitate connecting the canistered catalyst in a pipe or duct through which the air or other gas to be treated is flowed. As indicated above, usually the catalysts of the present invention will be provided in a number of segments, typically five to seven or eight segments spaced apart one from the other and suitably mounted within the canister. As is known in the art, at least with respect to ceramic-type substrate catalysts, a ceramic fiber blanket, such as that sold under the trademark CERABLANKET by Thermal Ceramics or under the trademark DURABLANKET S by the Carborundum Company may be employed. Such ceramic blankets are available in several different thicknesses and densities. The ceramic blanket is wrapped about the exterior surface of the catalyst segments in order to both provide thermal insulation and help to maintain the segments firmly mounted in place within the canister. As is also known in the art, instead of a ceramic blanket a resilient wire mesh may be utilized. If needed, suitable retaining rings or the like may also be utilized to securely mechanically retain the catalyst segments in place within the canister.

By providing an aluminum or aluminum alloy substrate (or a substrate made of another lightweight metal, such as titanium or a titanium alloy) a lightweight catalyst, which is particularly well adapted for use in aircraft by virtue of its low weight, may be attained. By utilizing a thin outer shell made of a strong lightweight metal such as titanium, further weight reductions may be attained. It has been found that the use of, for example, an aluminum or aluminum alloy substrate in a thin gauge titanium metal canister effects a reduction in the weight of the canistered catalyst to about 50 percent of the weight of a comparable conventional cordierite substrate catalyst.

EXAMPLE 2

Catalysts in accordance with the present invention made in accordance with Example 1 but comprising a palladium catalytic component loading of from 150 to 250 grams per cubic foot and a manganese oxide loading of from 0.03 to 0.30 grams per cubic inch in a catalyst composition having a catalyst bed volume of 331 cubic inches have been found to provide the following conversion efficiencies of ozone to oxygen at the indicated air inlet temperatures to the catalyst. (By conversion efficiency is meant the volume percentage of the original amount of ozone present which is converted to oxygen.) The inlet space velocity was in all cases 131,000 standard cubic feet per minute ("SCFM") (131,000 cubic feet per minute measured at standard conditions of temperature (72° F.=22.2° C.) and pressure (one atmosphere).

TABLE II

| Air Stream Inlet Temp. | Percent Conversion per Catalyst Stage |
|---|---|
| 70° F. (21.1° C.) | 80–90% |
| 100° F. (37.7° C.) | 99% |
| 200° F. (93.3° C.) | 99% |
| 300° F. (148.9° C.) | 90% |

EXAMPLE 3

A comparison was made of an ozone abatement catalyst in accordance with an embodiment of the present invention and a prior art comparative ozone abatement catalyst. The comparative catalyst was prepared as follows. A slurry was made by dispersing in water the silica alumina used to make the overlayer slurry in Example 1, together with manganese nitrate and a colloidal alumina binder. The alumina sol was used in an amount equal to 5% by weight of the silica-alumina refractory metal oxide powder. The resultant slurry was applied to a Corning 400 c/in$^2$ cordierite 8–10 mil wall monolith substrate by dipping the substrate in the slurry, removing excess slurry with high pressure air, drying at 100° C. and calcining at 450° C. for 2 hours. The resulting honeycomb had deposited on it 1.53 g/in$^3$ of silica-alumina/alumina sol and 0.07 g/in$^3$ of manganese oxide.

A solution of $Na_2PdCl_4$ and $NaHCO_3$ was made at a concentration designed to give the catalyst composition units a Pd concentration of 250 g/ft$^3$ after submerging the coated units in the Pd solution at room temperature for 2 hours. A hot (90° C.) sodium formate solution was prepared in a separate tank in which the Pd catalyzed units were placed and reduced for 30 minutes. After the reduction, the units were washed chloride free, as determined by testing the effluent of the wash water with $Ag(NO_3)_2$. The units were then heat treated at 200° C. This comparative catalyst is designated Catalyst C and has the following composition: 250 g/ft$^3$ Pd, 0.07 g/in$^3$ MnO and 1.52 g/in$^3$ of combined silica-alumina refractory metal oxide and alumina sol.

The catalyst in accordance with an embodiment of the present invention was an aluminum substrate catalyst of Example 1. This catalyst is designated Catalyst I and had the composition set forth in Example 1.

Catalysts C and I were tested under the following conditions: air containing 1.5 parts per million by volume ozone was introduced into the catalysts C and I at an inlet temperature of 300° F. (148.9° C.) and a space velocity of 131,000 SCFM.

The results shown in TABLE III were attained.

TABLE III

| | Catalyst C | Catalyst I |
|---|---|---|
| Ozone Conversion (%) | 90 to 93 | 94.9 |
| Pressure Drop Across the Catalyst (psi) | 0.95 | 0.65 |
| Pd Loading (g/ft$^3$) | 250 | 170 |

The data show that Catalyst I, the catalyst of the present invention, provided a higher ozone conversion that comparative Catalyst C despite the fact that Catalyst I contained a significantly low loading of the palladium catalytic component than did Catalyst C. Catalyst I also imposed a significantly lower pressure drop on the airstream being treated than did Catalyst C. Without wishing to be bound by any particular theory it is believed that the combination of the high density of palladium loading (attained by utilizing palladium tetraamine salts to impregnate the overlayer refractory metal oxide) and the porosity and high surface area of the overlayer refractory metal oxide results in the increased conversion efficiency attained by Catalyst I of the invention.

The effect of the undercoat layer on loss of the washcoat (the term "washcoat" refers to the entire coating, i.e., the undercoat and the overlayer) from the substrate was demonstrated as follows.

EXAMPLE 4

Additional catalyst samples were prepared by following the procedure in Example 1, except that the amount of the slurry solids in the undercoat was adjusted to give loadings as shown in TABLE IV. The application of the overlayer was held constant at 1.5 g/in$^3$. The slurries were applied to an aluminum honeycomb having 400 cells per square inch of end face area. Washcoat loss is measured by weighing the catalyst composition units before and after exposure to high pressure air flow from an air gun used to remove loose material. From the data it can be seen that the overlayer will have very poor adherence without an undercoat. However, if the undercoat loading is increased above 0.3 g/in$^3$, the coating process becomes very difficult.

TABLE IV

| Undercoat Loading g/in$^3$ | Overlayer Loading g/in$^3$ | Total Washcoat Loss % |
|---|---|---|
| None | 1.5 | >50 |
| 0.1–0.2 | 1.5 | 10 |
| 0.2–0.3 | 1.5 | 1–2 |
| 0.3–0.5 | 1.5 | Difficult to coat |
| >0.5 | 1.5 | Impossible to coat |

The effect of the manganese catalytic metal component on ozone conversion was demonstrated as follows.

EXAMPLE 5

Following the procedure outlined in Example 1, the undercoat was applied to an aluminum substrate having 400 cells per square inch of end face. The overlayer manganese oxide loading was varied by changing the amount of manganese nitrate added to the slurry. The study was conducted with samples containing from no manganese oxide to 0.70 g/in$^3$ of manganese oxide. Cores 1 inch in diameter by 0.85 inches in length were taken from the catalyst unit and evaluated in a laboratory reactor in a gas stream containing 2 ppm by volume ozone in air at a space velocity of 20 SCFM. The percent conversion of ozone was noted at different inlet air temperatures. As can be seen from TABLE IV, the addition of manganese to the palladium topcoat dramatically increases the catalyst activity at lower temperatures for decomposing ozone.

TABLE V

| Manganese Oxide Loading in Overlayer g/in$^3$ | Percent Ozone Conversion Gas Inlet Temperature | | |
|---|---|---|---|
| | 100° F. | 200° F. | 300° F. |
| None | 27.5 | 38.2 | 40.6 |
| 0.025 | 35.0 | 40.0 | 41.9 |
| 0.044 | 33.6 | 40.0 | 41.9 |
| 0.70 | 36.3 | 42.0 | 44.9 |

EXAMPLE 6

To evaluate the effect of different palladium salts on the degree of dispersion of the palladium catalytic metal component, a study was performed in which the Pd catalytic metal precursor used was varied in carrying out step 6 of the procedure of Example 1. The dispersion of the resultant 12.06% Pd content on the resulting silica-alumina refractory metal oxide powder was measured using a CO chemisorption technique. From TABLE VI it can be seen that the highest dispersions were achieved with palladium nitrate, palladium tetraamine acetate, and palladium tetraamine hydroxide used as the palladium precursors. It should be noted that the palladium nitrate gave variable results due to an exotherm generated during the decomposition which took place during calcining and which proved to be difficult to control. The results presented in TABLE VI represent the best result obtained for palladium nitrate.

TABLE VI

| Palladium Precursor | % Dispersion |
|---|---|
| Palladium Tetraamine Nitrate | 10 |
| Palladium Citrate Complex | 12 |
| Palladium Nitrate | 30 |
| Palladium Tetraamine Acetate | 45 |
| Palladium Tetraamine Hydroxide | 65 |

While the invention has been described with reference to specific preferred embodiments thereof, it will be appreciated by those skilled in the art that upon a reading and understanding of the foregoing numerous variations to the preferred embodiments may be attained which, nonetheless, lie within the spirit and scope of the appended claims.

What is claimed is:

1. A method for abating a noxious substance contained in air which method comprises contacting air containing such noxious substance with a catalyst composition comprising a catalytic material coated on a substrate, the catalytic material comprising: (a) an undercoat layer comprising a mixture of a fine particulate refractory metal oxide and a sol selected from the class consisting of one or more of silica, alumina, zirconia and titania sols; and (b) an overlayer comprising a refractory metal oxide support on which is dispersed at least one catalytic metal component.

2. A method for abating ozone contained in air which method comprises contacting air containing ozone with an ozone abatement catalyst composition comprising a catalytic material coated on a substrate, the catalytic material comprising: (a) an undercoat layer comprising a mixture of a fine particulate undercoat refractory metal oxide and a sol selected from the class consisting of one or more of silica, alumina, zirconia and titania sols; and (b) an overlayer comprising an overlayer refractory metal oxide support on which is dispersed a catalytic metal component comprising a catalytically effective palladium component.

3. The method of claim 1 or claim 2 wherein the undercoat layer comprises from about 5 to 50 percent by weight of the fine particulate refractory metal oxide and from about 50 to 95 percent by weight of the sol.

4. The method of claim 3 wherein the sol is a silica sol.

5. The method of claim 4 wherein at least one of the undercoat and overlayer refractory metal oxides comprises activated alumina.

6. The method of claim 4 wherein at least one of the undercoat and overlayer refractory metal oxides comprises a silica-alumina.

7. The method of claim 1 or claim 2 wherein the catalyst composition is a non-chloride composition.

8. The method of claim 1 or claim 2 wherein the catalytic material further comprises a chloride ion scavenger.

9. The method of claim 1 or claim 2 wherein the substrate comprises a body having a plurality of gas flow passages extending therethrough the passages being defined by walls on which the catalytic material is coated, and the loading of the underlayer does not exceed about 0.3 g/in$^3$.

10. The method of claim 7 wherein the catalytic metal component comprises a palladium component and a manganese component.

11. The method of claim 1 or claim 2 wherein the fine particulate refractory metal oxide of the undercoat and the refractory metal oxide of the overlayer are the same refractory metal oxide.

12. The method of claim 8 wherein the refractory metal oxide is a silica alumina comprising from about 5 to 50 percent by weight silica and from about 50 to 95 percent by weight alumina.

13. The method of claim 9 wherein the refractory metal oxide has a porosity of from about 0.75 to 1.5 cc/g, of pores of up to 1456 Angstroms in radius.

14. The method of claim 1 or claim 2 wherein the particulate refractory metal oxide of the undercoat layer is of a size such that at least 90 percent by volume of the particles have a diameter of not more than about 2 microns.

15. The method of claim 1 or claim 2 wherein the substrate comprises a metal substrate made of a metal selected from the class consisting of aluminum, aluminum alloys, titanium and titanium alloys.

16. The method of claim 1 or claim 2 wherein the sol is a silica sol.

17. The method of claim 1 or claim 2 wherein the catalytic metal component comprises a palladium component and a manganese component.

18. The method of claim 1 or claim 2 wherein the catalytic metal component comprises a palladium component dispersed on the overlayer refractory metal oxide by impregnating the overlayer refractory metal oxide with a palladium salt selected from the group consisting of palladium tetraamine salts and palladium nitrate.

19. The method of claim 18 wherein the palladium salt is selected from the group consisting of palladium tetraamine hydroxide and palladium tetraamine acetate.

20. The method of claim 18 containing from about 150 to 250 g/ft$^3$ of the palladium component.

21. The method of claim 20 wherein the catalyst composition further comprises a manganese component.

22. The method of claim 1 or claim 2 wherein said substrate is made from metal.

23. The method of claim 22 wherein said substrate is in the form of a honeycomb.

24. The method of claim 22 wherein said substrate comprises the blades of a fan.

25. The method of claim 22 wherein said substrate is a structure over which the air of an air handling system is forced in turbulent flow.

26. The method of claim 1 or claim 2 wherein said substrate is made from a ceramic-like material and is the form of a honeycomb.

27. The method of claim 26 wherein said substrate is made from cordierite.

28. A method for abating carbon monoxide contained in air which method comprises contacting air containing carbon monoxide with a carbon monoxide abatement catalyst composition comprising a catalytic material coated on a substrate, the catalytic material comprising: (a) an undercoat layer comprising a mixture of a fine particulate undercoat refractory metal oxide and a sol selected from the class consisting of one or more of silica, alumina, zirconia and titania sols; and (b) an overlayer comprising an overlayer refractory metal oxide support on which is dispersed a catalytic metal component comprising a catalytically effective palladium component.

* * * * *